United States Patent [19]

Stemme et al.

[11] 4,313,663
[45] Feb. 2, 1982

[54] ELECTROOPTIC DIAPHRAGM AND CIRCUIT OPERATIVE FOR CAUSING THE DIAPHRAGM TO OPEN UP STEPWISE AND THEN CLOSE TO TERMINATE EXPOSURE

[75] Inventors: Otto Stemme, Munich; Eduard Wagensonner, Aschheim, both of Fed. Rep. of Germany

[73] Assignee: Agfa-Gevaert AG, Leverkusen, Fed. Rep. of Germany

[21] Appl. No.: 29,911

[22] Filed: Apr. 16, 1979

[30] Foreign Application Priority Data

Apr. 18, 1978 [DE] Fed. Rep. of Germany ....... 2816851

[51] Int. Cl.³ .......................... G03B 9/56; G02F 1/13
[52] U.S. Cl. ................................ 354/271; 354/227; 350/336
[58] Field of Search ............... 354/227, 271; 350/331, 350/336, 331 R

[56] References Cited

U.S. PATENT DOCUMENTS

| | | | |
|---|---|---|---|
| 3,883,227 | 5/1975 | Kobayashi et al. | 350/336 |
| 3,892,471 | 7/1975 | Biermann et al. | 350/336 |
| 3,955,208 | 5/1976 | Wick et al. | 354/227 |
| 3,981,559 | 9/1976 | Channin | 350/336 |
| 4,054,890 | 10/1977 | Shimomura | 354/227 |
| 4,116,544 | 9/1978 | Soref | 350/336 |

*Primary Examiner*—Joseph W. Hartary
*Assistant Examiner*—William B. Perkey

*Attorney, Agent, or Firm*—Michael J. Striker

[57] ABSTRACT

Radially successive annular electrodes disposed in a general plane define between themselves intermediate annular zones in which is confined electrooptic material. Selected annular zones are rendered transparent by applying to pairs of selected annular electrodes potential differences which extend through the electrooptic material in the direction in which the general plane extends, not perpendicular to the general plane. The annular zones are rendered transparent in cumulative succession proceeding radially outwards, and have surface areas such that, as each next annular zone becomes transparent too, the transparent area of the arrangement doubles each time. A control circuit includes a counter whose outputs are connected to the inputs of a gating network, the latter having outputs connected to various ones of the annular electrodes, establishing the rate at which the cumulatively successive changes of state of radially outwardly successive annular zones proceeds. After all zones have been rendered transparent, they all are rendered non-transparent simultaneously to terminate an exposure, if this has not already been done by a light-totalizing circuit. The light-totalizing circuit includes a counter which counts a pluse train and reaches a predetermined count after a time interval which depends on scene light, the reaching of the predetermined count causing all annular zones thus far rendered transparent to go non-transparent.

9 Claims, 5 Drawing Figures

ELECTROOPTIC DIAPHRAGM AND CIRCUIT OPERATIVE FOR CAUSING THE DIAPHRAGM TO OPEN UP STEPWISE AND THEN CLOSE TO TERMINATE EXPOSURE

BACKGROUND OF THE INVENTION

The present invention concerns photographic cameras provided with electrooptic shutters, typically comprised of either liquid-crystal or else ferroelectric material. Such electrooptic diaphragms usually comprise a concentric arrangement of usually circular annular electrodes defining radially successive annular zones containing electrooptic material, and a control circuit is used to establish how many adjoining annular zones are to be rendered transparent, in order to thereby establish the size of the exposure aperture, either under automatic control in dependence upon measured scene light or else under manual selection.

It will be appreciated that camera diaphragms involving the use of moving mechanical parts are known in an enormous variety of designs and these are subject to a certain amount of frictional wear during use.

Likewise, it is known to provide a liquid-crystal electrooptic diaphragm comprised of radially overlapping annular liquid-crystal zones, involving the use of plural carrier structures, in order to avoid the establishment of intermediate zones between electrodes in which transparency cannot be controlled.

SUMMARY OF THE INVENTION

It is one object of the invention to provide a novel electrooptic diaphragm of such character as not to require the use of plural carrier structures for the electrooptic material and/or for the annular electrodes. Also, the diaphragm should be of such design as to avoid the existence of intermediate annular zones whose transparency or electrooptical state is not controllable. Additionally, it is an object to provide a novel electrooptic diaphragm well suited for control by a digital exposure-parameter control circuit.

In the preferred embodiment illustrated herein, each main annular zone of the diaphragm is defined radially intermediate respective inner and outer ring electrodes, with all the inner, or else all the outer, ring electrodes being maintained at reference potential, and with the outer, or else the inner, ring electrodes receiving control voltage causing the electrooptic material of selected annular zones to undergo a change of electrooptical state resulting in zone transparency. When control voltage is applied to the inner, or else the outer, electrodes of two adjoining main annular zones, both are rendered transparent and furthermore the intermediate annular zone defined between the inner electrode of the more outwards one of the two adjoining main annular zones and the outer electrode of the other of the two adjoining main annular zones is likewise rendered transparent, leaving no non-transparent intermediate zone between the main annular zones. Conversely, if control voltage is not thusly applied to the inner, or else the outer, electrodes of two adjoining main annular zones, because the two adjoining main zones are to stay non-transparent, with the inner electrode of the outer zone and the outer electrode of the inner zone both at the same potential, then the intermediate annular zone between the adjoining main annular zones likewise remains non-transparent.

The invention also contemplates, most preferably, the use of such electrooptic diaphragm as a shutter-diaphragm, i.e., operative during the course of an exposure for stepwise increase of the exposure-aperture size and operative for going entirely non-transparent to terminate the exposure. The preferred control circuit disclosed herein for implementing this action includes the use of an aperture-opening counter which counts pulses from a pulse generator, a gating network having inputs connected to counter outputs and outputs connected to respective inner, or else outer, annular electrodes and serving to establish the cumulative progression with which radially outwardly successive zones undergo changes of electrooptical state resulting in transparency.

A light-totalizing counter may be used to render all presently transparent zones non-transparent and thereby terminate an exposure, when a predetermined count has been reached, the predetermined count being dependent upon the scene-light level, either by establishment of a predetermined count which is in itself scene-light-dependent, or by controlling the repetition frequency of the pulses counted by the light-totalizing counter in dependence upon scene light. In this way, during or subsequent to completion of the stepwise opening-up of the aperture, the diaphragm goes non-transparent when the totalized value of scene light has reached a value appropriate for a good exposure. Additionally, means can be provided for limiting the duration of an exposure, and rendering the entire diaphragm non-transparent after a predetermined maximum time interval, if this has not already been done by the light-totalizing circuitry.

To improve the uniformity of the electrical field established within the selected annular zones of the diaphragm, the inner annular electrodes can be provided with radially outwardly extending electrode segments, and the outer annular electrodes with radially inwardly extending electrode segments, interdigitated. These radially extending electrode segments are scarcely visible and do not affect the sharpness of the image cast upon the camera's film, nor do they except negligibly affect the transparency of the diaphragm arrangement as a whole.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIGS. 1a, 1b, 2b and 3 together depict a second exemplary embodiment.

DESCRIPTION OF THE PREFERRED EMBODIMENTS

Figure 1A:
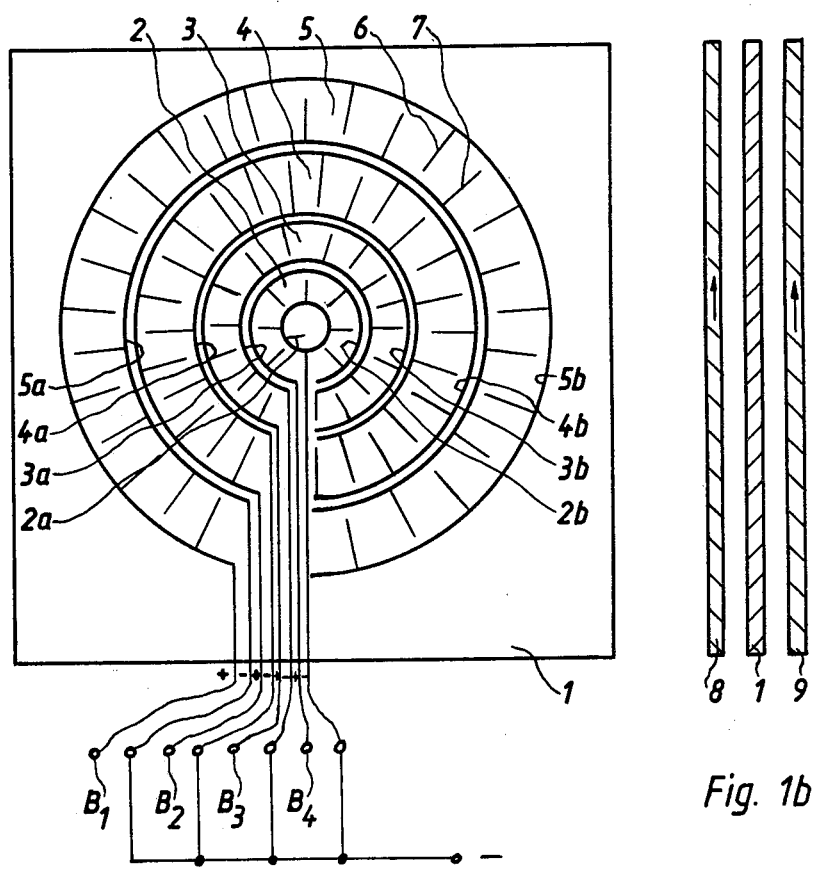
FIGS. 1a, 1b, 2a and 3 together depict a first embodiment of the invention.
Figure 1B:
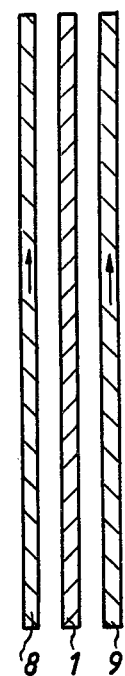

In FIGS. 1a and 1b, numeral 1 denotes in toto an electrooptic diaphragm comprised, for example, of liquid-crystal or ferroelectric material. Electrooptic diaphragm 1 is comprised of four main annular zones 2, 3, 4 and 5. The individual main annular zones 2, 3, 4, 5 are defined by respective inner electrode rings 2a, 3a, 4a, 5a and by respective outer electrode rings 2b, 3b, 4b, 5b.

Additionally, the electrooptic diaphragm 1 comprises secondary or intermediate annular zones: the first between electrode rings 2b and 3a, the second between electrode rings 3b and 4a, and the third between electrode rings 4b and 5a. All the inner electrode rings 2a–5a are connected to a common potential, for example as shown the negative terminal of a (non-illustrated) battery. The outer electrode rings 2b–5b are connected to respective ones of four terminals B1, B2, B3, B4, to individual ones of which control voltage can be applied in order to change the electrooptical states of individual ones of the four main zones 2–5, e.g., to render individual ones of the four main zones 2–5 simply transparent in the case of the use of liquid-crystal material for example. The electrooptic diaphragm 1 can, for example, be essentially fabricated of two transparent plates between which the radial succession of electrode rings 2a–5a and 2b–5b are firmly confined, with the electrooptic material of the diaphragm 1 likewise confined between the two plates and filling all the space intermediate radially successive ones of the electrode rings 2a–5a and 2b–5b.

When positive control voltage is applied via terminal B1 to the outer electrode ring 2b of smallest annular zone 2, the electrooptical state of zone 2 is altered; additionally, the electrooptical state of the intermediate annular zone between electrode ring 2b and next-outer electrode ring 3a is similarly altered, resulting in a change of electrooptical state of all the material radially intermediate electrode ring 2a and electrode ring 3a. If positive control voltage is applied via terminals B1 and B2 to both the outer electrode ring 2b of smallest main annular zone 2, and also to the outer electrode ring 3b of next-larger main annular zone 3, then the electrooptical state of main zone 3 is thusly altered, too; furthermore, the electrooptical state of the intermediate zone between electrode rings 3b and 4a is likewise altered, resulting in a change of electrooptical state of all the electrooptic material radially intermediate electrode ring 2a and electrode ring 4a. And so forth.

To increase and improve the field-strength distribution within the electrooptic material intermediate the inner and outer electrode rings 5a, 5b of main annular zone 5, inner electrode ring 5a is provided with a comb-like arrangement of radially outwardly extending electrode segments 7, and outer electrode ring 5b is provided with a comb-like arrangement of radially inwardly extending electrode segments 6. The other pairs of electrode rings 2a and 2b, 3a and 3b, 4a and 4b are likewise provided with such radially inwardly and outwardly extending electrode segments, for the same purpose.

The electrooptic material radially inward of radially innermost electrode ring 2a is uncontrolled with regard to its electrooptical state, being bounded only by electrode ring 2a, and is allowed to permanently remain in a state resulting in non-transparency of this innermost circular zone of the diaphragm 1. The surface area of this innermost circular zone is made as small as possible, much smaller than the surface area of the surrounding main annular zone 2, in order that this very small circular zone of non-transparency not be perceptible in a photograph made through the diaphragm 1.

As shown in FIG. 1b, the electrooptic diaphragm 1 can be located intermediate two polarization filters 8 and 9 whose respective polarization directions are rotated by 90° relative to each other.

Figure 2A:
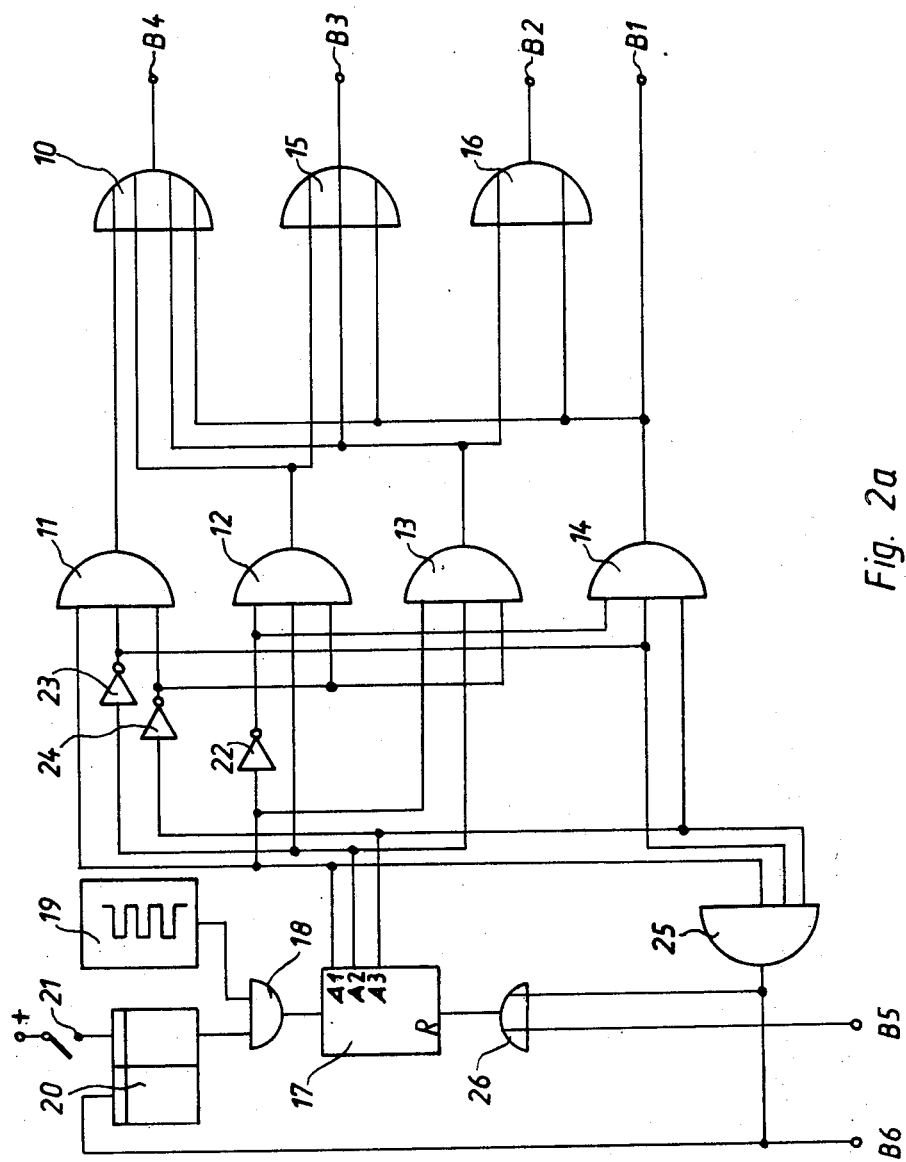

As shown in FIG. 2a, the four control-voltage terminals B1–B4 already mentioned are connected to respective outputs of a gating network.

In particular, the control-voltage terminal B4 associated with the smallest annular zone is connected to the output of an OR-gate 10, whose first input is connected to the output of an AND-gate 11, the second input of OR-gate 10 being connected to the output of an AND-gate 12, its third input being connected to the output of an AND-gate 13, and its fourth input being connected to the output of an AND-gate 14.

The control-voltage terminal B4 associated with the second-smallest annular zone is connected to the output of a second OR-gate 15. OR-gate 15 has its first input connected to the output of AND-gate 12, its second input to the output of AND-gate 13, and its third input to the output of AND-gate 14.

The control-voltage terminal B2 of the next-larger annular zone is connected to the output of a third AND-gate 16. AND-gate 16 has its first input connected to the output of AND-gate 13, and its second input to the output of AND-gate 14.

The control-voltage terminal B1 associated with the largest annular zone is connected directly to the output of AND-gate 14.

The AND-gates 11, 12, 13, 14 are controlled by a digital counter 17 whose counting input is connected via an AND-gate 18 to a pulse generator 19. The other input of AND-gate 18 is connected to the output of a storage flip-flop 20, preferably an RS-flip-flop. The control input of flip-flop 20 is connectable to positive voltage by means of a switch 21.

In the illustrated embodiment, the diaphragm 1 is used not only as a diaphragm, but additionally to terminate exposures, with the successively more outwards zones of the diaphragm being rendered transparent one after the next, and with all of them being rendered non-transparent simultaneously to terminate the exposure. Accordingly, here, the frequency of pulse generator 19 establishes the speed with which the opening-up of the shutter-diaphragm 1 proceeds. The electrooptic diaphragm 1 can, for example, be located behind a conventional shutter which opens preliminary to the start of an exposure while diaphragm 1 is still entirely non-transparent, and then closes subsequent to completion of the exposure after diaphragm 1 has been rendered entirely non-transparent once more.

Counter 17 has a first output A1 connected to the first input of AND-gate 11, via an inverter 22 connected to the first input of AND-gate 12, and connected to the first input of AND-gate 13 directly. The second output A2 of counter 17 is connected via an inverter 23 to the second input of AND-gate 11, to the second input of AND-gate 12 directly, and to the second input of AND-gate 13 directly. The third output A3 of the counter 17 is connected via an inverter 24 to the third input of AND-gate 11, to the third input of AND-gate 12 directly, and to the third input of AND-gate 13 directly. The first input of AND-gate 14 is connected via an inverter 22 to the first output A1 of counter 17, its second input via the inverter 23 to the second output A2 of counter 17, and its third input to the third output A3 of counter 17 directly.

Additionally, outputs A1 and A3 of counter 17 are connected to the first and third inputs of an AND-gate 25 directly, and output A2 of the counter is connected to the second input of AND-gate 25 through the intermediary of the inverter 23. The output of AND-gate 25 is connected to one input of an OR-gate 26, whose output is connected to the reset input R of the aperture-opening counter 17. In the illustrated circuit, after the outermost and last of the annular zones of the diaphragm has been rendered transparent, a "1" signal is produced at the output of AND-gate 24, causing aperture-opening counter 17 to reset. As a result, after the completion of an aperture-opening counting cycle by counter 17, negative voltage becomes applied to all control terminals B1–B4 and the entire diaphragm 1 is rendered non-transparent.

The output of AND-gate 25 is additionally connected to the reset input of flip-flop 20, as a result of which this flip-flop reverts to its starting setting, disabling AND-gate 18, after completion of the aperture-opening cycle, preventing further pulses from being transmitted from pulse generator 19 to aperture-opening counter 17.

Figure 3:
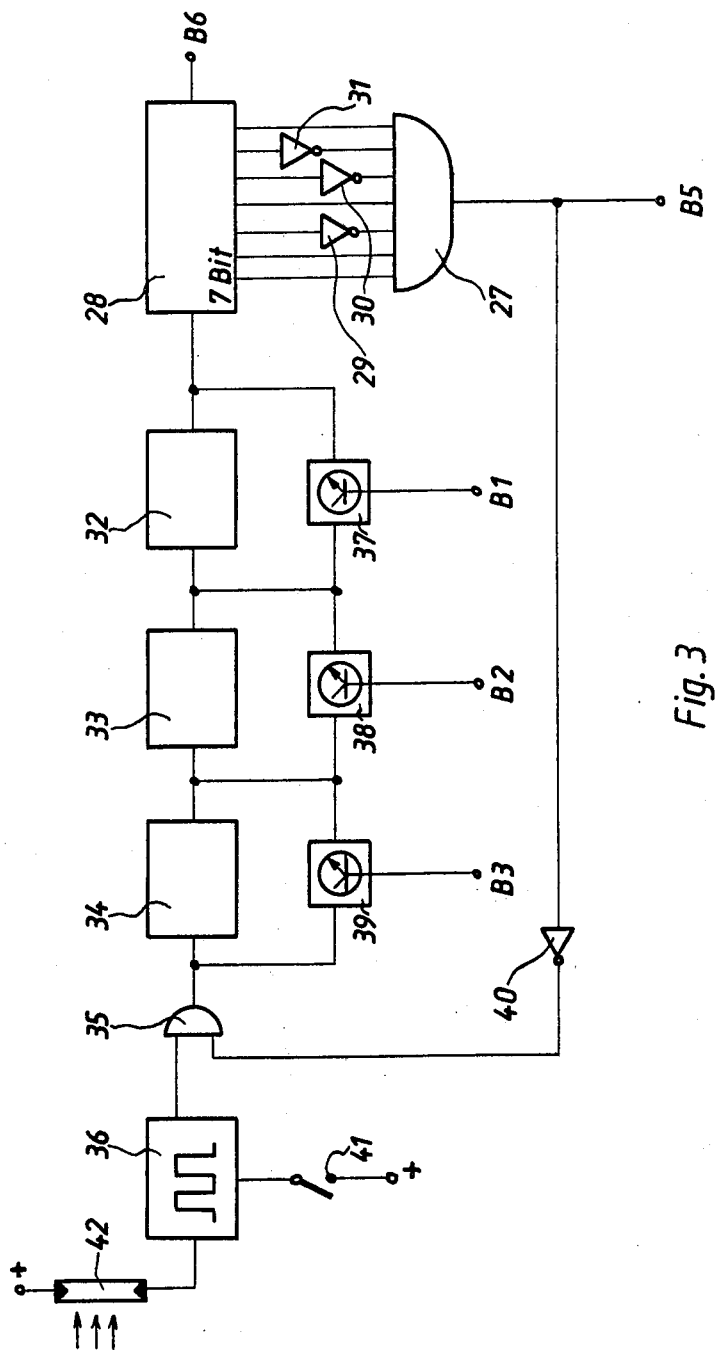

The left input B5 of OR-gate 26 is, as shown in FIG. 3 connected to the output of an AND-gate 27 of a scene-light totalizing circuit. Additionally, the output of AND-gate 25 is connected via terminal B6 to the reset input of a 7-bit counter 28 contained within the totalizing circuit of FIG. 3.

Light-totalizing counter 28 has seven outputs, of which the first, second, fourth and seventh are connected without intermediary to respective inputs of the AND-gate 27, with the third, fifth and sixth outputs being connected to inputs of AND-gate 27 via respective inverters 29, 30 and 31.

The counting input of light-totalizing counter 28 is connected to the output of a chain of three frequency-dividing stages 32, 33, 34, the input of which is connected to the output of an AND-gate 35. The upper input of AND-gate 35 is connected to the output of a pulse generator 36. The period of the pulse train produced by pulse generator 36 is low compared to the intervals elapsing between the transparent of one diaphragm zone and the rendering transparent of the next diaphragm zone.

The frequency-dividing stages 32, 33, 34 can be individually bypassed by respective ones of three semiconductor switches 37, 38, 39. The control input of semiconductor switch 37 is connected via terminal B1 to the output of AND-gate 14 (FIG. 2a), the control input of switch 38 to the output of OR-gate 16, and the control input of switch 39 to the output of OR-gate 15.

The output of AND-gate 27 is connected via an inverter 40 to the lower input of AND-gate 35.

Numeral 41 denotes a switch-on contact for pulse generator 36. The frequency of the pulse train produced by pulse generator 36 is determined by a photoresistor 42, or other equivalent light detector, exposed to scene light. The light-dependent resistance of photoresistor 42 causes the frequency of the pulse train produced by pulse generator 36 to be scene-light-dependent. The frequency of the pulse train which pulse generator 36 produces for a midway scene-light level is selected large relative to the frequency of the pulse train produced by the pulse generator 19 of the aperture-opening circuit of FIG. 2a. Additionally, the frequency of pulse generator 36 should be designed to be sizable relative to that of pulse generator 19 even for low scene-light levels, e.g., such as are at the limit of the range in which hand-held as opposed to tripod exposure can still be made, in order to assure sufficient resolution and accuracy of the system.

When switch 21 is closed at the initiation of an exposure, a "1" signal is applied to the left input of AND-gate 18, enabling it for pulse transmission, and each pulse produced by pulse generator 19 is counted by aperture-opening counter 17. After a predetermined number of pulses have been counted, a "1" signal is produced at the output of AND-gate 11. In the illustrated circuit, this occurs when the outputs A1, A2, A3 of counter 17 respectively carry "1", "0" and "0" signals. A "1" signal appears at the output of OR-gate 10, with the result that diaphragm zone 2, and also the intermediate zone between contact rings 2b and 3a, becomes transparent.

Then, when counter 17 reaches a count at which its outputs A1, A2, A3 respectively carry "0", "1" and "0" signals, a "1" signal appears at the output of AND-gate 12, so that "1" signals are present both on the output of OR-gate 10 and now also on the output of OR-gate 15. As a result, both diaphragm zone 2 (and the intermediate zone just radially outwards of it) and also diaphragm zone 3 (and the intermediate zone just radially outwards of it) are now transparent.

Then, when counter 17 reaches a count at which its outputs A1, A2, A3 respectively carry "1", "1" and "0" signals, a "1" signal appears at the output of AND-gate 13. As a result, each of the three main diaphragm zones 2, 3, 4 is now transparent, as well as the three intermediate zones located just radially outwards of respective ones of these main zones.

When counter 17 reaches a count at which its outputs A1, A2, A3 respectively carry "0", "0" and "1" signals, a "1" signal furthermore appears at the output of AND-gate 14, as a result of which all four main diaphragm zones 2, 3, 4, 5, and the three intermediate zones between neighboring pairs of them, are now transparent.

When thereafter counter 17 reaches a count at which its outputs A1, A2, A3 respectively carry "1", "0" and "1" signals, a "1" signal is furthermore produced at the output of AND-gate 25, and from there is applied via OR-gate 26 to the reset input of aperture-opening counter 17, resetting the latter, i.e., if this has not already occurred by virtue of an earlier application of a "1" signal to input B5 of OR-gate 26.

Switch-on contact 41 of the light-totalizing circuit of FIG. 3 closes simultaneously with switch 21 of FIG. 2a. The light-dependent-frequency pulse generator 42, 36 transmits pulses via the AND-gate 35 and the chain of frequency dividers 34, 33, 32 to the counting input of light-totalizing counter 28. In the illustrated embodiment, by way of example, each frequency divider 32, 33, 34 is a frequency halver, and the surface areas of the radially outwardly successive diaphragm zones 2, 3, 4, 5 are such that, each time the radially outwardly next zone becomes transparent, this doubles the transparent surface area of the diaphragm. Accordingly, after zone 2 has been rendered conductive, when zone 3 is rendered conductive too, this doubles the aperture area previously unblocked by zone 2 alone. The "1" signal produced at this point on terminal B3 of FIG. 2a is furthermore applied to the control input of semiconductor switch 37, rendering the latter conductive and thereby bypassing frequency halver 32. As a result, the frequency of the pulse train applied to light-totalizing counter 28 is doubled, to take into account the doubling of the transparent surface area of the diaphragm.

When the third diaphragm zone 4 becomes transparent too, the "1" signal produced at terminal B2 renders switch 38 conductive, bypassing frequency halver 33, and thereby once more doubling the frequency of the pulse train transmitted to light-totalizing counter 28.

When the last diaphragm zone 5 also becomes transparent, a "1" signal is applied to switch 39, bypassing frequency halver 34 as well, thereby effecting a further doubling of the frequency of the pulse train counted by the light-totalizing counter, in accordance to this further doubling of the transparent surface area of the diaphragm.

Figure 2B:
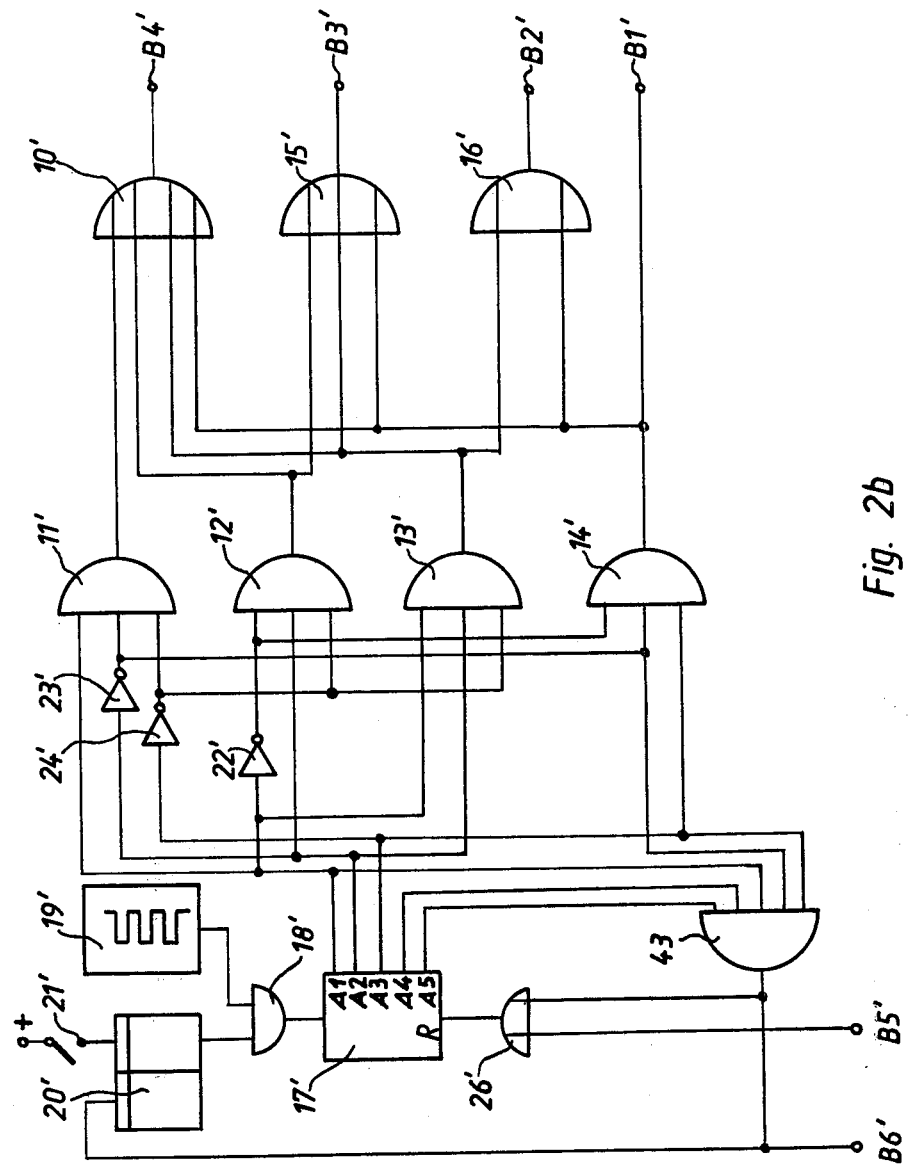

FIG. 2b depicts a modified version of the circuitry shown in FIG. 2a, with components corresponding to those of FIG. 2a being denoted by the same reference numerals as there, but primed. In FIG. 2b the aperture-opening counter 17' has five outputs A1–A5. An AND-gate 43, corresponding to AND-gate 25 of FIG. 2a, has two further inputs connected to the further outputs A4 and A5 of counter 17'.

As a result, AND-gate 43 does not produce an output "1" signal until each one of the counter outputs A1–A5 is carrying a "1" signal, i.e., this occurring later than the rendering transparent of the largest and last diaphragm zone 5. However, both in the case of the AND-gate 25 of FIG. 2a and in the case of the AND-gate 43 of FIG. 2b, the AND-gate causes the exposure to terminate when a predetermined value for the longest permissible exposure (e.g., the longest permissible hand-held exposure) has been reached, if the exposure has not meanwhile been terminated by the scene-light totalizing circuit of FIG. 3.

It will be understood that each of the elements described above, or two or more together, may also find a useful application in other types of circuits and constructions differing from the types described above.

While the invention has been illustrated and described as embodied in a photographic-camera diaphragm system in which an electrooptic diaphragm opens up stepwise, under automatic control, during the performance of an exposure and furthermore entirely closes to terminate the exposure, likewise under automatic control, it is not intended to be limited to the details shown, since various modifications and structural changes may be made without departing in any way from the spirit of the present invention.

For example, it will be clear that the circuits shown in FIGS. 2a, 2b and 3, although presently preferred, are merely exemplary and would be capable of very considerable variation and modification. Likewise, more generally, the electrooptic diaphragm need not open up stepwise, nor under automatic control, nor additionally serve to initiate and/or terminate the exposure itself. Furthermore, by way of example, in the embodiment depicted in FIG. 1 the intermediate zones between adjoining main annular zones are kept of very short radial dimension, in order that, for example, the comb-like arrangements of electrode segments 6, 7 not be used for them also, but in principle the annular intermediate zones could be of greater radial dimension.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An electrooptic diaphragm arrangement for use in a photographic camera, comprising, in combination,
   a layer of electrooptic material defining a general plane; and
   a set of electrodes located along said general plane and spaced from one another in directions parallel to the general plane, adjoining ones of the electrodes defining between themselves zones within the general plane, said electrodes being relatively narrow and said zones being substantially broader than said electrodes,
   whereby when potential differences are applied across selected pairs of electrodes the electrooptic states of selected ones of said zones are controlled by means of electric fields which pass parallel to said general plane through the electrooptic material within said zones.

2. An electrooptic diaphragm arrangement as defined in claim 1; further comprising means operative for changing the electrooptic states of the electrooptic material of selected zones by applying across pairs of selected electrodes potential differences resulting in state-controlling electrical fields which pass parallel to said general plane through the electrooptic material within said zones.

3. An electrooptic diaphragm arrangement as defined in claim 1, the set of electrodes comprising a set of radially successive annular electrodes, ajoining ones of the electrodes defining between themselves annular zones.

4. An electrooptic diaphragm arrangement as defined in claim 3, the radially successive annular electrodes being circular and concentric, the zones being circular and concentric.

5. An electrooptic diaphragm arrangement as defined in claim 2, the set of electrodes comprising a group of first electrodes and a group of second electrodes which alternate with the first electrodes proceeding along a predetermined direction,
   said means comprising means maintaining one group of electrodes at a predetermined reference potential and means operative for changing the electrooptical states of the electrooptic material in selected zones by applying to selected ones of the other group of electrodes a control potential differing from the reference potential.

6. An electrooptic diaphragm arrangement as defined in claim 5, the electrodes and the zones being circular and concentric, the second electrodes alternating with the first electrodes proceeding along a radial direction.

7. An electrooptic diaphragm arrangement as defined in claim 6, the first and second electrodes being so spaced as to form a radial succession of main annular zones of comparatively large radial dimension and a radial succession of intermediate annular zones of comparatively small radial dimension, the main zones alternating with the intermediate zones in a radially successive manner.

8. An electrooptic diaphragm arrangement as defined in claim 7, the radially innermost electrode of said set of electrodes defining radially inward of itself a central zone having a surface area at least one order of magnitude smaller than the surface area of the radially innermost one of said main annular zones.

9. An electrooptic diaphragm arrangement as defined in claim 7, the first electrodes being provided with radially extending projections, the second electrodes being provided with radially extending projections, the radially extending projections of the first and second electrodes being interdigitated with each other within respective ones of said main annular zones.

* * * * *